United States Patent
Rochberger

(10) Patent No.: US 6,310,877 B1
(45) Date of Patent: Oct. 30, 2001

(54) METHOD OF CONNECTIONLESS MESSAGE TRANSFER IN AN ASYNCHRONOUS TRANSFER MODE NETWORK

(75) Inventor: Haim Rochberger, Netanya (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/070,479

(22) Filed: Apr. 30, 1998

(51) Int. Cl.[7] .................................................. H04L 12/28
(52) U.S. Cl. ...................... 370/395; 370/392; 370/397; 370/399
(58) Field of Search ................................... 370/231, 236, 370/395, 397, 410, 422, 389, 392, 399, 409, 471

(56) References Cited

U.S. PATENT DOCUMENTS

| | | | |
|---|---|---|---|
| 5,313,454 | * 5/1994 | Bustini et al. | 370/13 |
| 5,452,293 | * 9/1995 | Wilkinson et al. | 370/54 |
| 5,483,536 | 1/1996 | Gunji et al. | 370/85.14 |
| 5,550,818 | 8/1996 | Brackett et al. | 370/60 |
| 5,566,014 | 10/1996 | Glance | 359/124 |
| 5,742,905 | * 4/1998 | Pepe et al. | 455/461 |
| 6,108,708 | * 8/2000 | Iwata | 709/238 |
| 6,128,305 | * 10/2000 | Hjalmtysson et al. | 370/410 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, AddisonWesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

*Primary Examiner*—Dang Ton
*Assistant Examiner*—Toan Nguyen
(74) *Attorney, Agent, or Firm*—Howard Zaretsky

(57) ABSTRACT

A method of transferring relatively short messages in an Asynchronous Transfer Mode network utilizing an emulated connectionless oriented technique. The method permits a short burst of data to be transmitted between users, utilizing a modified signaling scheme. The signaling scheme is modified so as to emulate a connectionless scheme whereby messages are transferred with no guarantee of delivery. The length of a message can be up to 47 bytes, i.e., the length of the data content of a single ATM cell. The method includes sending a setup message from the source user to the attached node requesting that a call of the fast type be set up. In response to this setup message, the attached node replies with a connect message indicating to the source user that it can immediately begin to transmit its short message. Thus, the source user does not have to wait before sending any data for the setup message to propagate through the network to the destination user and then have the connect message, generated by the destination user, return to the source user. The attached node, calculates a route and forwards the setup message to the subsequent node. Each node along the path configures its software and hardware to receive the call. Once the short message is received by a node and forwarded to the subsequent node, the node releases the resources allocated for the call.

21 Claims, 4 Drawing Sheets

METHOD OF CONNECTIONLESS MESSAGE TRANSFER IN AN ASYNCHRONOUS TRANSFER MODE NETWORK

FIELD OF THE INVENTION

The present invention relates generally to data communication networks and more particularly relates to a method of transferring messages in an Asynchronous Transfer Mode network using a connectionless calling scheme.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical length becomes operational, the nodes attached to it initiate and exchange information via a well known Virtual Channel Connection (VCC) used as a PNNI Routing Control Channel (RCC).

Hello message are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet which is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets which contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the Exchanging state the database summary packets contain summaries of the topology state information contained in the node's database. In the case of logical group nodes, those portions of the topology database that where originated or received at the level of the logical group node or at higher levels are included in the database summary. The PTSP and PTSE header information of each such PTSE is listed is listed in one of the nodes database packets. PTSEs for which new instances are received after the exchanging status have been entered may not be included in any database summary packet since they will be handled by the normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchanging state and the Loading state. The node can sent a PTSE request pack to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network. Additional information on link state routing can be found in Section 9.2 of the book Interconnections: Bridges and Routers by Radia Perlman, Addison-Wesley, 1992, incorporated herein by reference.

Once the topology of the network is learned by all the nodes in the network, routes can be calculated from source to destination users. A routing algorithm that is commonly used to determine the optimum route from a source node to a destination node is the Dijkstra algorithm. The Dijkstra algorithm is used to generate the Designated Transit List which is the routing list used by each node in the path during the setup phase of the call.

Besides connection oriented protocols like ATM, there exist connectionless protocol such as user Datagram Protocol (UDP) which is widely used on the Internet and other TCP/IP networks. UDP is a connectionless protocol, in contrast to ATM and Transmission Control Protocol (TCP) which are connection oriented protocols. In some situations, a connection oriented protocol is not needed. There are times when having a connection is not beneficial to an application, and might even be undesirable due to the overhead burden and added network traffic. In such cases, a connectionless protocol is desirable. A major benefit of the reduced functionality of a connectionless call is that the signaling from end to end is much simpler than with standard connection oriented calling.

A major disadvantage, however, with connectionless protocols, is that they do not provide reliability, since an indication that a message has been received properly his not sent back to the sender. In addition, connectionless protocols do not offer error recovery capabilities, thus these functions must be provided by higher layers of applications.

SUMMARY OF THE INVENTION

The present invention is a method of transferring relatively short messages in an Asynchronous Transfer Mode (ATM) network utilizing an emulated connectionless oriented technique. The method permits a short burst of data between users, utilizing a modified signaling scheme. The signaling scheme is modified so as to emulate a connectionless scheme, such as that used commonly for Internet traffic, e.g., UDP traffic, whereby messages are transferred with no guarantee of delivery. Data delivery reliability should thus be handled at the upper layers in the user's communication protocol stack such as at the Transport or Application layers. However, a benefit of the reduced functionality of a connectionless call is that the signaling from end to end is much simpler than with standard connection oriented calling.

The length of a message can be up to 47 bytes, i.e., the length of the data content of a single ATM cell. Thus, the data that is to be transferred via this method must fit into one ATM cell. Otherwise multiple short messages must be transferred and the data combined at the application level.

The method comprises sending a setup message from the source user to the attached node requesting that a call of the fast type be set up. The setup message includes the address of the destination user. In response to this setup message, the attached node replies with a connect message indicating to the source user that it can immediately begin to transmit its short message. Thus, the source user does not have to wait before sending any data for the setup message to propagate through the network to the destination user and then have the connect message, generated by the destination user, return to the source user. This round trip time is eliminated and the data is transferred more quickly.

The attached node, calculates a route, e.g., DTL, and forwards the setup message to the subsequent node. Each node along the path configures its software and hardware to receive the call. Once the short message is received by a node and forwarded to the subsequent node, the node releases the resources allocated for the call.

There is therefore provided in accordance with the present invention, in an Asynchronous Transfer Mode (ATM) network including a source user, destination user and one or more nodes, a method of transferring a short message via a fast connectionless type call, the method comprising the steps of sending, from the source user to its attached node, a setup message indicating that a fast type call is to be set up to the destination user, configuring the attached node to receive the short message from the source user, sending, from the attached node to the source user, a connect message indicating to the source user to immediately begin transmitting the short message, calculating a routing path to the destination user by the attached node, transmitting the short message from the source user to the attached node, at each node on the routing path: forwarding the setup message to the next node on the routing path, configuring the node to receive the short message from the previous node, forwarding the short message to the next node on the routing path, releasing resources allocated for the fast type call once the short message has been forwarded to the next node on the routing path, at the last node on the routing path: forwarding the setup message to the destination user, configuring the last node to receive the short message from the previous node, forwarding the short message to the destination user and releasing resources allocated for the fast type call once the short message has been forwarded to the destination user.

The step of configuring the attached node comprises the step of configuring the hardware and/or the software within the attached node to receive and forward the short message. The step of configuring the node comprises the step of configuring the hardware and/or the software within the node to receive and forward the short message. The method further comprising the step of initializing a timer on each node along the routing path, the expiration of the timer causing the call to be released. The short message may comprise a single ATM cell.

There is also provided in accordance with the present invention, in an Asynchronous Transfer Mode (ATM) network including a source user, destination user and one or more nodes, a method of transferring a short message via a fast connectionless type call, the method comprising the steps of sending, from the source user to its attached node, a setup message indicating that a fast type call is to be set up to the destination user, sending, from the attached node to the source user, a connect message indicating to the source user to immediately begin transmitting the short message, transmitting the short message from the source user to the attached node, calculating a routing path to the destination user, forwarding the setup message to each node on the routing path in sequential fashion, forwarding the short message to each node on the routing path in sequential fashion, releasing resources at each node allocated for the fast type call once the short message has been forwarded to the subsequent node on the routing path and forwarding the short message to the destination user.

The step of forwarding the short message comprises the step of configuring the hardware and/or the software within each node to receive and forward the short message. The method further comprises the step of initializing a timer on each node along the routing path, the expiration of the timer causing the call to be released.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CCITT | Comite Consulatif International Telegraphique et Telephonique |
| DS | Database Summary |
| DTL | Designated Transit List |
| FDDI | Fiber Distributed Data Interface |
| FSM | Finite State Machine |
| IISP | Interim Inter-Switch Signaling Protocol |
| ITU | International Telecommunications Union |
| PNNI | Private Network to Network Interface |
| PTSE | PNNI Topology State Element |
| PTSP | PNNI Topology State Packet |
| RCC | Routing Control Channel |
| TCP | Transmission Control Protocol |
| TCP/IP | Transmission Control Protocol/Internet Protocol |
| UDP | User Datagram Protocol |
| UNI | User to Network Interface |
| VCC | Virtual Channel Connection |
| VCI | Virtual Circuit Indicator |
| VPI | Virtual Path Indicator |

General Description

The present invention is a method of transferring relatively short messages in an Asynchronous Transfer Mode (ATM) network utilizing an emulated connectionless oriented technique. The method permits a short burst of data between users, utilizing a modified signaling scheme. The signaling scheme is modified so as to emulate a connectionless scheme, such as that used commonly on Internet traffic, whereby messages are transferred with no guarantee of delivery. Data delivery reliability should thus be handled at the upper layers in the user's communication protocol stack such as at the Transport or Application layers. The length of a message can be up to 47 bytes, i.e., the length of the data content of a single ATM cell. Thus, the data that is to be transferred via this method must fit into one ATM cell. Otherwise multiple short messages must be transferred and the data combined at the application level.

Figure 1:
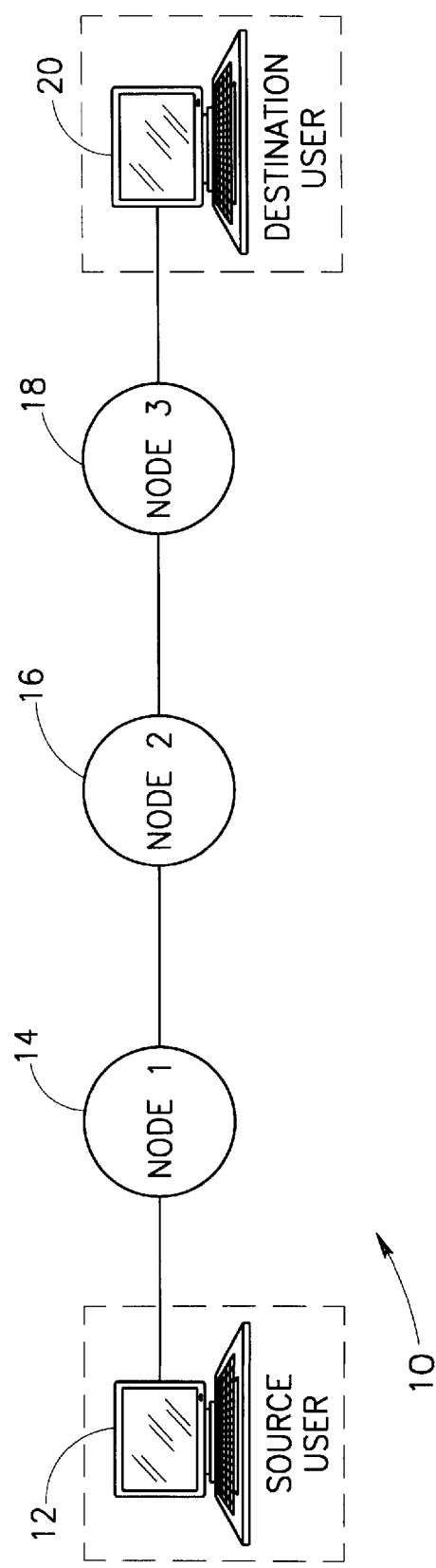
FIG. 1 is a diagram illustrating an example ATM network consisting of three nodes and a source and destination user.

A diagram illustrating an example ATM network consisting of three nodes and a source and destination user is shown in FIG. 1. The example ATM network, generally referenced 10, comprises a source user 12 and a destination user 20. The network 10 comprises three nodes: node #1 14, node #2 16 and node #3 18. This network is presented only to illustrate the principles of the present invention. The scope of the present invention is not limited to the example shown here but can be applied to any ATM network configuration. It is important to note that in an ATM network, the data that is to be transferred from one location to another, travels via the same path as the control data, i.e., signaling data.

Figure 2A:
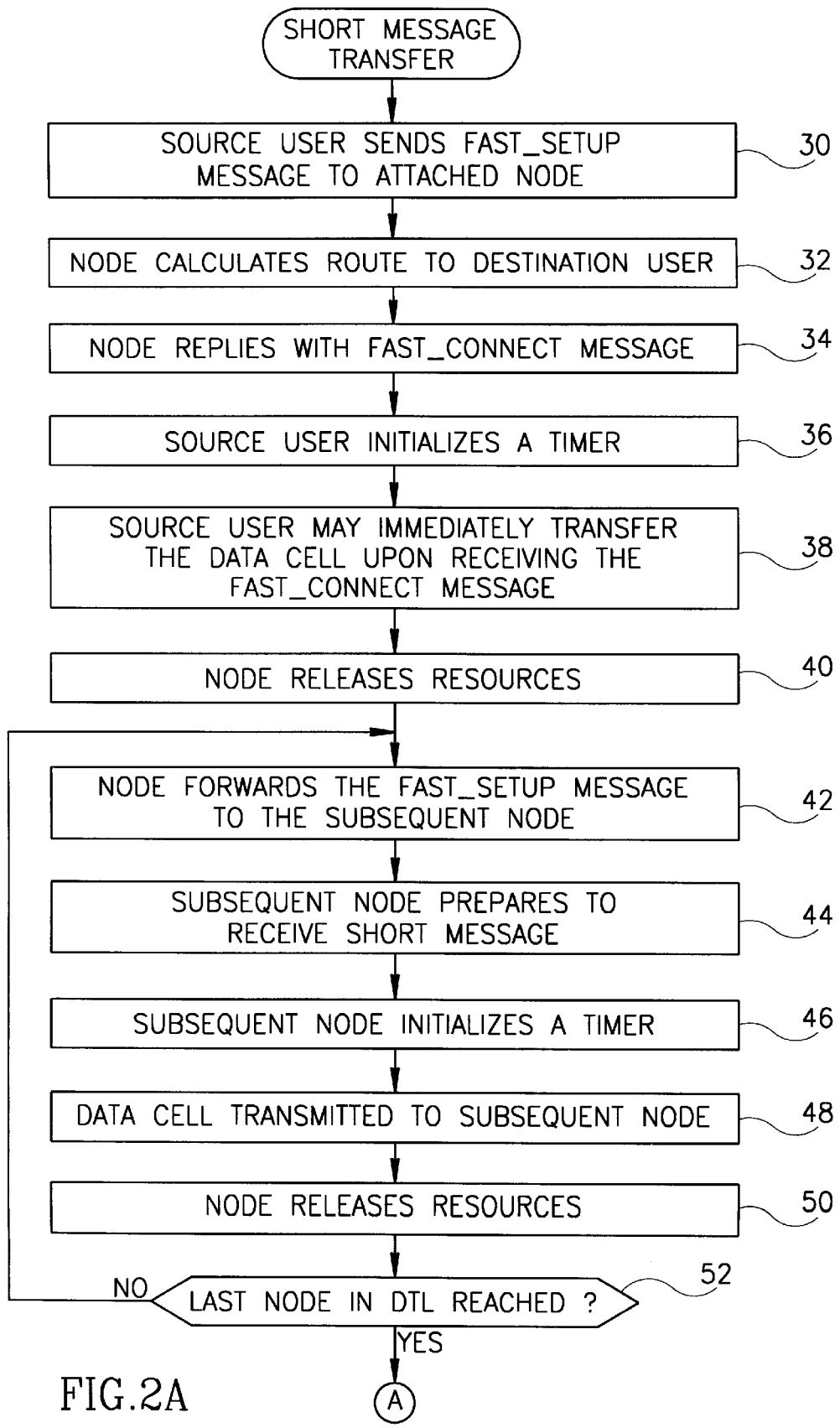
FIG. 2 is a flow diagram illustrating the method of the present invention of transferring short messages over an ATM network using a connectionless scheme.
Figure 2B:
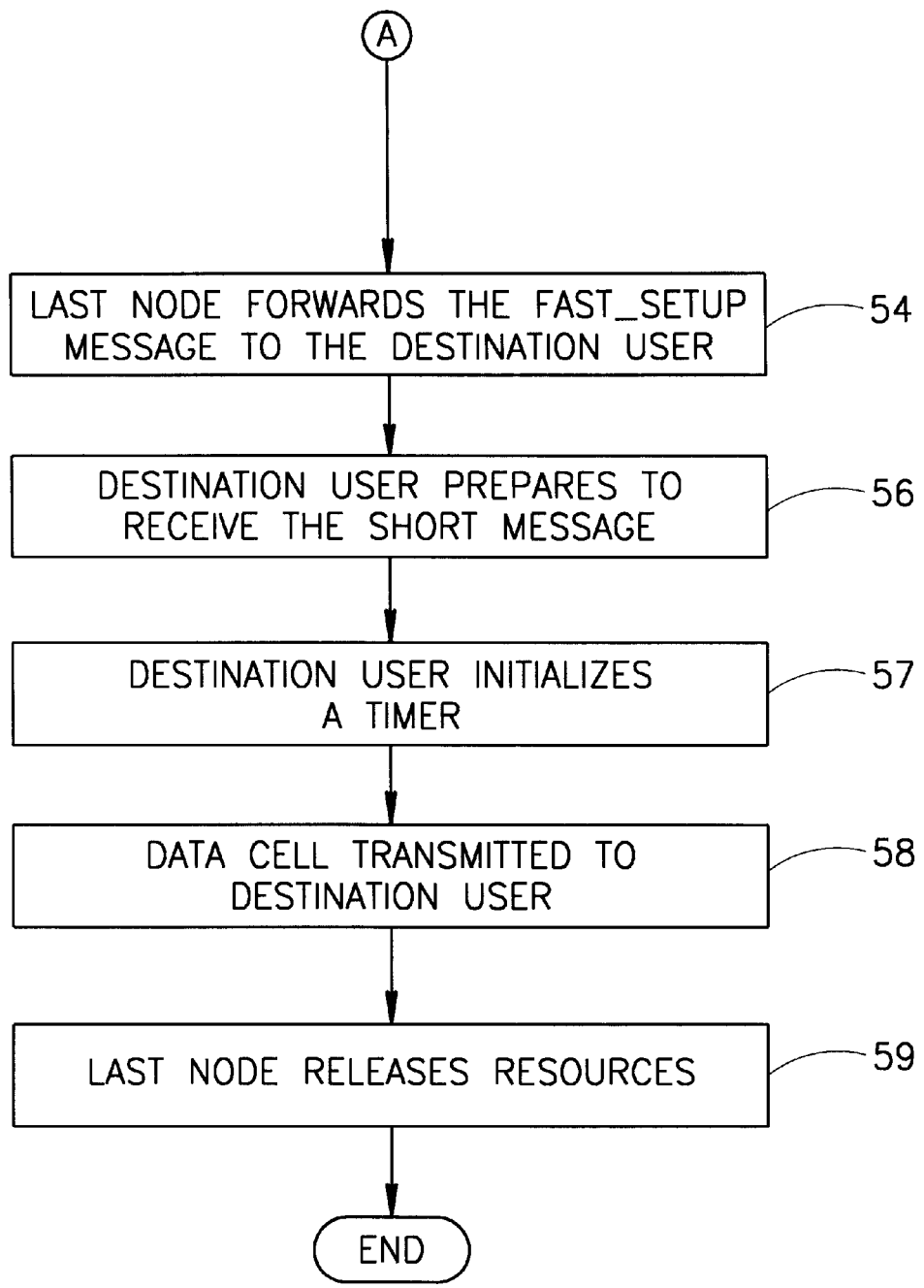

The method of short message transfer of the present invention will now be described in more detail. A flow diagram illustrating the method of the present invention of transferring short messages over an ATM network using a connectionless scheme is shown in FIG. 2. With reference to FIGS. 1 and 2, when the source user 12 wants to connect to the destination user 20 utilizing the fast connectionless short data transfer method of the present invention, it first sends a FAST_SETUP message to the switch it is attached to (step 30). The ATM address of the destination node 20 is included in the FAST_SETUP message. In the example shown in FIG. 1, the source user 12 sends FAST_SETUP message to node 1.

The node attached to the source user that receives the FAST_SETUP message then calculates a route to the destination user using a suitable routing algorithm, e.g., Dijkstra (step 32). The node then replies back to the source user with a FAST_CONNECT message (step 34). Note that the VPI/VCI allocation is performed in the conventional manner by one of the sides as in the ATM standard. The attached node, in response, then configures (programs) its hardware to accommodate the fast connectionless call.

The node then initializes a timer (step 36). Under normal operating conditions, the timer counts for a time in the order of 5 to 15 milliseconds. If the timer expires, before any data is received from the source user, the software frees the call at the local node and the hardware is cleared of the call as well.

Upon receiving the FAST_CONNECT message, the source node may immediately transmit the data cell to the attached node (step 38). Once the source user transmits the data cell to the attached node, the source user can release its resources utilized for the call (step 40).

In contrast to conventional signaling in ATM networks, the source user does not have to wait for a CONNECT message from the destination node before beginning data transmission. Thus, the method of the present invention slashes the time that a user must wait between issuing a call SETUP message and before data transmission can begin. The larger the number of nodes required to reach the destination, the larger is the time saved by using the fast message method of the present invention.

The attached node, at or around the same time that it sends the FAST_CONNECT message to the source user, also forwards the FAST_SETUP message to the subsequent node in accordance with the Designated Transmit List (DTL), in the case of PNNI (step 42). In response to receiving the FAST_SETUP message, the subsequent node configures its hardware and software to receive the data cell, i.e., short message (step 44). The subsequent also initializes a timer similar to that of the previous node for clearing the call if no cell is received from the previous node (step 46).

The node then transmits the data cell to the subsequent node (step 48). Once the data cell is received by the subsequent node, the previous node releases its resources that were allocated for the short message call (step 50). The step of forwarding the FAST_SETUP message according to the DTL through releasing the node's resources (steps 42 though 50) are then repeated until the last on the DTL is reached (step 52).

At the last node, the FAST_SETUP message is forwarded to the destination user (step 54). The destination user then configures its software and/or hardware to receive the short message (step 56). The destination user also initializes a timer (step 57). Expiration of the timer causes the destination user to clear the call. The data cell is then transmitted from the last node and received by the destination user (step 58). The last node then releases the resources previously allocated for the call (step 59).

It is an important aspect of the present invention that the source user transmit its data cell without waiting for a CONNECT or similar type message from the destination user. This means that data cell may be transmitted by the source user before the destination user receives the FAST_SETUP message. In addition, the destination user does not send any type of CONNECT or similar type message back to the source user in response to receiving the FAST_SETUP message. Only the node attached to the source user replies with a FAST_CONNECT message to the source user. Thus, the round trip signaling message propagation time from the source user to the destination user and back is saved.

Further, unlike in conventional ATM signaling, e.g., PNNI signaling, there is no release message that propagates from the destination user to the source user or vice versa. In the present invention, the release is implicitly initiated and carried out by each node locally either (1) after it forwards the data cell received from the previous node to the subsequent node or (2) when the timer associated with that particular call expires.

Note also, that at each node along the path, the conventional input port and output port data is stored in the local database. In particular, the VPI/VCI pair associated with the input port and the VPI/VCI pair associated with the output port are generated and stored in the database by the node software.

Figure 3:
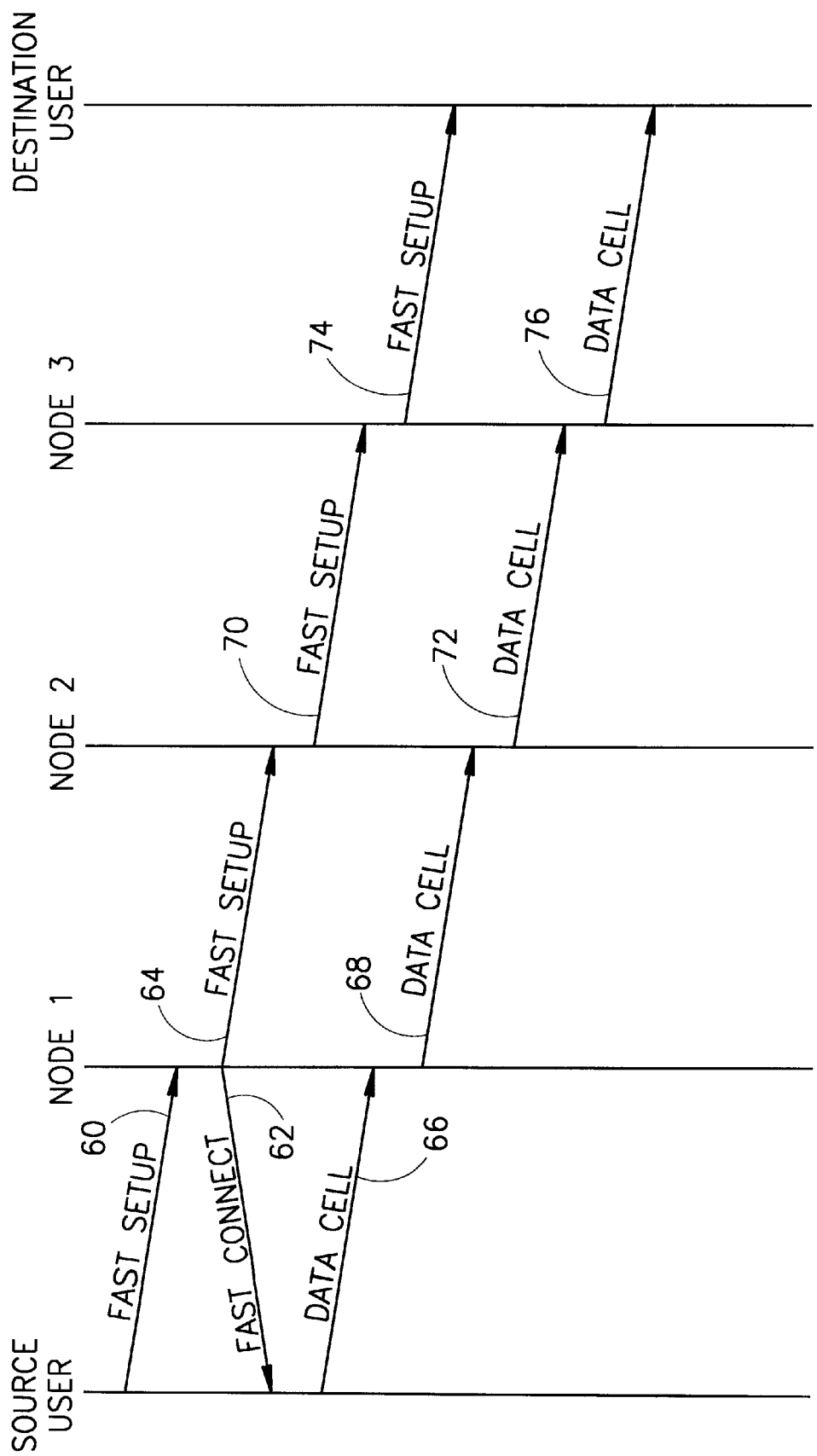
FIG. 3 is a message flow diagram illustrating the method of the present invention and the corresponding chronological sequence of message transfer between various nodes and users in the network.

A message flow diagram illustrating the method of the present invention and the corresponding chronological sequence of message transfer between various nodes and users in the network is shown in FIG. 3. With reference to FIGS. 1, 2 and 3, the messages transferred between the source user 12, node #1, node #2, node #3 and the destination user 20 are shown in FIG. 3. First, the source user sends a FAST_SETUP message (referenced 60) to node #1, the node it is attached to. Node #1, in response, calculates a DTL using a suitable routing algorithm such as Dijkstra, configures its hardware and software to handle the call and forwards the FAST_SETUP message to node #2 (referenced 64). Node #1 also replies to the source user with a FAST_CONNECT message (referenced 62).

The source user, in response to the FAST_CONNECT message, sends the data cell to node #1 (referenced 66). Node #1, upon receipt of the data cell, forwards it to node #2 (referenced 68). Once node #1 forwards the data cell to node #2, node #1 clears the call. Since the data path for the data cell is preferably via software rather than hardware, the software can better control the call setup and tear down phases. In particular, the receipt of the data cell triggers the release of the call resources (call tear down), e.g., the VPI/VCIs on the input and output ports are released.

In this fashion, and in accordance with the method described above in connection with FIG. 2, the FAST_SETUP message is propagated from node #2 to node #3 (referenced 70) and finally to the destination user (referenced 74). Similarly, the data cell is forwarded from node #2 to node #3 (referenced 72) and finally to the destination user (referenced 76).

Note that if any of the FAST_SETUP messages get lost along the path, the connections up to the last node that received the FAST_SETUP message will be freed once the data cell is received, since the receipt of the data cell causes the node to release its resources associated with the call. The data cell, however, will be discarded at the last node receiving the FAST_SETUP message.

If the data cell is lost along the path, then the timers in each of the nodes will eventually expire. When each time expires, it causes the hardware and software on its node to locally clear the call and release resources previously allocated for the call.

While the invention has been described with respect to a limited number of embodiments, it will be appreciated that many variations, modifications and other applications of the invention may be made.

What is claimed is:

1. In an Asynchronous Transfer Mode (ATM) network including a source user, destination user and one or more nodes, a method of transferring a short message via a fast connectionless type call, said method comprising the steps of:

sending, from said source user to its attached node, a setup message indicating that a fast type call is to be set up to said destination user;

configuring said short message from said source user;

sending, from said attached node to said source user, a connect message indicating to said source user to immediately begin transmitting said short message;

calculating a routing path to said destination by said attached node, the routing path including selected ones of said one or more nodes, the routing path including a last node, each of the nodes on the routing path having an associated next node and previous node and a previous node;

transmitting said short message from said source user to said attached node;

at each node on said routing path:
    forwarding said setup message to the next node of each node on said routing path;
    configuring the each node to receive said short messages from the previous node of the each node;
    forwarding said short message the next node of the each node on said routing path;
    releasing resources allocated on each node once said short message has traversed all of the nodes on said routing path;

at the last node on said routing path:
    forwarding said message to said destination user;
    configuring the last node to receive said short message from the previous node of the last node;
    forwarding said short message to said destination user; and
    releasing resources allocated on the last node once said short message has been forwarded to said destination user.

2. The method according to claim 1, wherein said setup message comprises a fast_setup message.

3. The method according to claim 1, wherein said connect message comprises a fast_connect message.

4. The method according to claim 1, wherein said step of configuring said attached node comprises the step of configuring the hardware and/or the software within said attached node to receive and forward said short message.

5. The method according to claim 1, wherein said step of configuring the node comprises the step of configuring the hardware and/or the software within the node to receive and forward said short message.

6. The method according to claim 1, further comprising the step of initializing a timer on each node along said routing path, the expiration of said timer causing said call to be released.

7. The method according to claim 1, wherein said short message comprises a single ATM cell.

8. In an Asynchronous Transfer Mode (ATM) network including a source user, destination user and one or more nodes, a method of transferring a short message via a fast connectionless type call, said method comprising the steps of:

sending, from the source user to its attached node, a setup message indicating that a fast type call is to be set up to said destination user;

sending, from said attached node to said source user, a connect message indicating to the source user to immediately begin transmitting said short message;

transmitting said short message from the source user to said attached node;

calculating a routing path to said destination user, the routing path including a plurality of nodes, each of the plurality of nodes including a subsequent node;

forwarding said setup message to each of said plurality of nodes on said routing path in sequential fashion;

forwarding said short message to each of said plurality of nodes on said routing path in sequential fashion;

releasing resources at each of said plurality of nodes on said routing path once said short message has been forwarded to the subsequent node of the each node on said routing path; and forwarding said short message to said destination user.

9. The method according to claim 8, wherein said setup message comprises a fast_setup message.

10. The method according to claim 8, wherein said setup message comprises a fast_setup message.

11. The method according to claim 8, wherein said step of forwarding said short message comprises the step of configuring the hardware and/or the software within each node to receive and forward said short message.

12. The method according to claim 8, further comprising the step of initializing a timer on each node along said routing path, the expiration of said timer causing said call to be released.

13. The method according to claim 8, wherein said short message comprises a single ATM cell.

14. A method of short message transfer in an asynchronous transfer mode (ATM) network between a source user and a destination user via one or more nodes, said one or more nodes including a first node, each of said nodes having an associated upstream node and an associated downstream node, said method comprising the steps of:

transmitting a first fast setup message from said source user to the first of said one or more nodes;

forwarding a second fast setup message from said one or more nodes to the downstream node in response to said first of said one or more nodes receiving said first fast setup message from said source node;

each node of said one or more nodes forwarding a distinct fast setup message to its downstream node and lastly to said destination user in response to receiving said distinct fast setup message from its upstream node;

transmitting a fast connect message from said first of said one or more nodes to said source user in response to said first of said one or more nodes receiving said first fast setup message from said source node;

transmitting a short message from said source user to said first of said one or more nodes in response to said source user receiving said fast connect message, wherein said short message is transmitted from said source user before receipt by said destination user of said distinct fast setup message;

each node of said one or more nodes transmitting said short message to its downstream node and lastly to said destination user after receipt of said short message from the upstream node and after forwarding said distinct fast setup message to the downstream node of the each node; and each node of said one or more nodes releasing call resources after said short message is forwarded to the downstream node of said each node.

15. The method according to claim 14, wherein said step of each node forwarding the distinct fast setup message comprises the step of generating a route to its downstream node.

16. The method according to claim 14, wherein said step of each node forwarding the distinct fast setup message comprises the step of configuring the hardware and/or the software within each node to receive and forward said short message.

17. The method according to claim 14, further comprising the step of releasing call resources on a node in response to the expiration of a timer initiated upon receipt of the distinct fast setup message.

18. The method according to claim 14, wherein said short message comprises a single ATM cell.

19. A method of transferring short messages comprising a single cell in an asynchronous transfer mode (ATM) network between a source user and destination user via one or more nodes, said one or more nodes including a first node, each of said nodes having an associated upstream node and an associated node, said method comprising the steps of:

transmitting a first fast setup message from said source user to the first of said one or more nodes;

forwarding a first fast setup message from said first of said one or more nodes to the downstream node of the first of said one or more nodes in response to said first of said one or more nodes receiving said first fast setup message from said source node;

each node of said one or more nodes forwarding a distinct fast setup message to its downstream node and lastly to said destination user in response to receiving the distinct fast setup message from its upstream node;

transmitting a fast connect message from said first of said one or more nodes to said source user in response to said first of said one or more nodes receiving said first fast setup message from said source node;

transmitting a short message from said source user to said first of said one or more nodes in response to said source user receiving said fast connect message, wherein said short message is transmitted from said source user before receipt by said destination user of said distinct fast setup message; and each node of said one or more nodes transmitting said short message to its downstream node and lastly to said destination user after receipt of said short message from its upstream node and after forwarding said distinct fast setup message to its downstream node.

20. The method according to claim 19, further comprising the step of each node releasing call resources after said short message is forwarded to its downstream node.

21. The method according to claim 19, further comprising the step of releasing call resources on a node in response to the expiration of a timer that is initiated upon receipt by a node of said distinct fast setup message.

* * * * *